L. HUBERTY.
CHURN DASHER.
APPLICATION FILED JUNE 20, 1912.
1,040,682.
Patented Oct. 8, 1912.
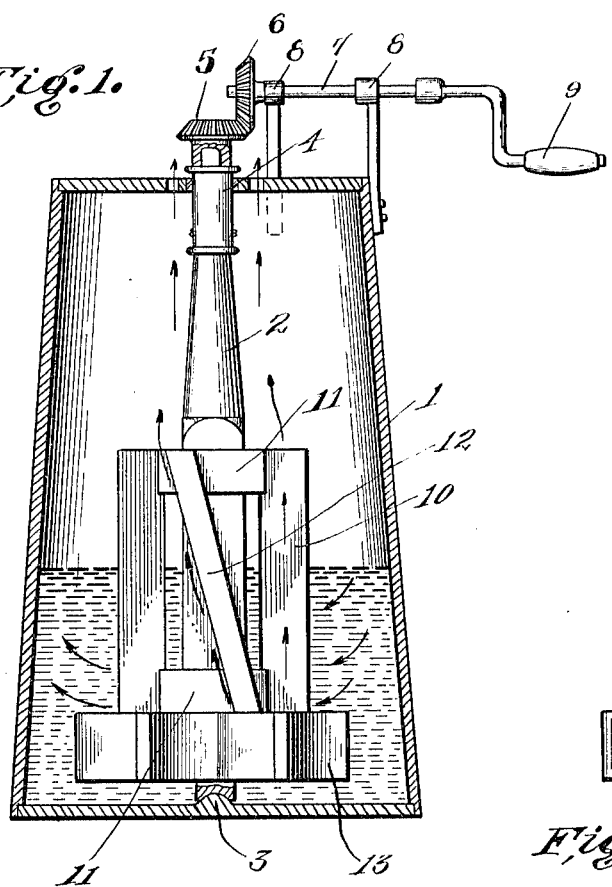
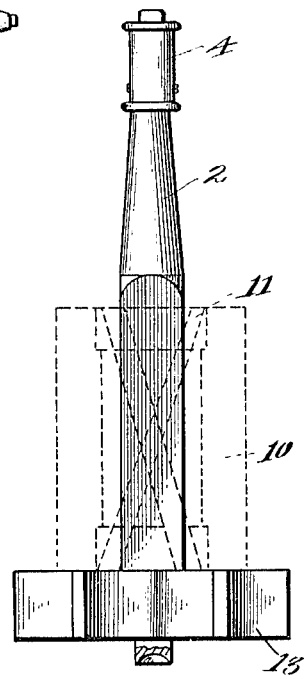
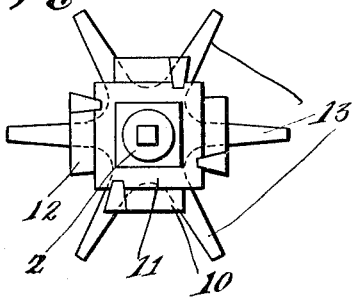
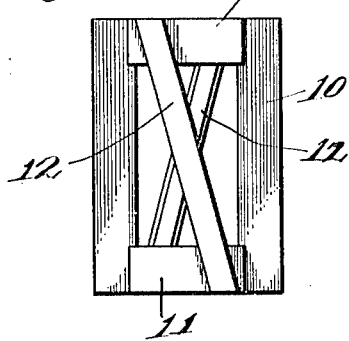
Witnesses
Robt Meyer.
J. W. Sherwood.
Inventor
Lewis Huberty.
By Franklin H. Hough
Attorney
COLUMBIA PLANOGRAPH CO., WASHINGTON, D. C.

UNITED STATES PATENT OFFICE.

LEWIS HUBERTY, OF CANTON, OHIO.

CHURN-DASHER.

1,040,682.

Specification of Letters Patent.

Patented Oct. 8, 1912.

Application filed June 20, 1912. Serial No. 704,842.

*To all whom it may concern:*

Be it known that I, LEWIS HUBERTY, a citizen of the United States, residing at Canton, in the county of Stark and State of Ohio, have invented certain new and useful Improvements in Churn-Dashers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in churn dashers and it relates more particularly to that class of dashers which are designed to rotate within a vertical churn body.

The invention has for its object, among others, the provision of a churn dasher of this character in which the parts are convertible so as to render the use of the dasher equally efficient at different seasons of the year.

It is known that during the spring and summer seasons, when cows feed upon grass, that the cream produced from the milk is much heavier and more dense than is the cream produced in the fall and winter season when the cows are fed upon hay and other dry feed. The heavy cream produced during the spring and summer seasons, it is found, contains a greater amount of gas than is contained in the lighter cream produced during the winter season and I have found that, in the churning of heavy cream thus charged with gas, the best results are effected by the use of a churn dasher so constructed as to effect a thorough agitation of the cream at the bottom of the churn body and which, at the same time, will provide a ready outlet for the gas through perforations provided at the top of the churn.

An essential object of the present invention resides in the provision of a convertible churn dasher provided with a removable section adapted for use in the spring and summer seasons and to be removed from the dasher at other seasons of the year.

To these ends and to such others as the invention may pertain, the same consists in the peculiar construction and in the combination, arrangement and adaptation of parts, all as will be more fully hereinafter described, shown in the accompanying drawings and then specifically defined in the appended claim.

The invention is clearly illustrated in the accompanying drawings which, with the numerals of reference marked thereon, form a part of this specification and in which:—

Figure 1 is a central vertical sectional view of the churn provided with my improved form of dasher. Fig. 2 is a side elevation of the dasher as used in churning light cream, the removable attachment adapted for use in churning heavy cream being indicated in dotted lines. Fig. 3 is a top plan view of the entire dasher, and Fig. 4 is a side elevation of the removable attachment used in churning heavy cream.

Reference now being had to the details of the drawings by numeral, 1 represents the vertically disposed churn body which may be of any of the approved forms of construction such as are in common use.

2 is the dasher, the hollow lower end of which is seated or journaled upon a lug or extension 3 rising from the bottom of the churn body and at its upper end journaled within suitable bearings 4 and at its extreme upper end, above the top of the churn, is provided a beveled gear 5 adapted to mesh with a like beveled gear 6 carried at the end of a horizontally disposed shaft 7, which shaft is journaled in suitable bearings 8, 8 connected with the body of the churn, and at its outer end the said shaft is provided with a suitable crank handle 9. The lower portion of the dasher stem 2 is preferably rectangular in cross section and sleeved upon this rectangular portion of the dasher is a removable portion 10 which is adapted for use in connection with the dasher when the churn is used in churning heavy cream. This portion 10 rests at its lower end upon a substantially star-shaped dasher 13 which is carried at the lower end of the rectangular section upon which the member 10 is sleeved.

The section 10 is provided at its upper end with suitable rectangular frames 11, the interior of which conform to the size of the squared portion of the dasher stem over which it is passed and upon each of its sides the said portion 10 is provided with inclined strips 12, the upper ends of which strips 12 are connected with the upper frames 11, one upon each side of the frame at points adjacent to one of the corners of said section, the opposite end of the strip terminating at a point near the opposite end of the lower section 11 of the frame to which it is attached.

From the foregoing description of construction, the operation of the dasher will at once be readily understood. When the dasher is complete and in readiness for use in churning heavy cream, the member 10 is passed over the rectangular lower portion of the dasher and occupies the position indicated in Fig. 1 of the drawings. It will be at once noted that a rotation of the dasher will at once effect and maintain a current of cream from the upper to the lower portion of the body of the cream contained within the churn, as indicated by the curved arrows in Fig. 1 of the drawings. It will also be noted that, while the cream is thus more effectually agitated near the bottom of the churn body, the gases contained within the cream are forced upward and out at the top of the churn, as indicated by the straight arrows shown in said figure.

When the churn is used in producing butter from a lighter body of cream, such as is produced in the fall or winter season, the member 11 is dispensed with, the same being removed from the churn dasher by lifting it off from its seat upon the rectangular lower portion of the dasher and, when this member is removed, the dasher, as indicated in Fig. 2 of the drawings, is used, the section 10 having been removed therefrom.

Having thus described my invention, what I claim to be new and desire to secure by Letters Patent is:—

A churn having a dasher and shaft to which the same is fixed, said shaft having an angular outlined shank portion, a second dasher having angular outlined openings in the upper and lower ends thereof adapted to receive the angular shank portion of said shaft upon which it is loosely mounted and its lower end resting upon the dasher which is fixed to the end of the shaft, and means for rotating the latter, as set forth.

In testimony whereof I hereunto affix my signature in the presence of two witnesses.

LEWIS HUBERTY.

Witnesses:
 LAURENCE C. KEELER,
 O. D. NEIGHBOR.

---

Copies of this patent may be obtained for five cents each, by addressing the "Commissioner of Patents, Washington, D. C."